United States Patent [19]

LeClerc

[11] 4,003,860

[45] Jan. 18, 1977

[54] NONSHRINK CELLULAR RUBBER COMPOSITION

[75] Inventor: André LeClerc, Overijse, Belgium

[73] Assignee: Phillips Petroleum Company, Bartlesville, Okla.

[22] Filed: June 9, 1975

[21] Appl. No.: 585,163

[52] U.S. Cl. ............... 260/2.5 HA; 260/2.5 HB; 260/28.5 A; 260/876 B; 260/28.5 B

[51] Int. Cl.² ............................ C08J 9/10

[58] Field of Search ..... 260/876 B, 2.5 HB, 2.5 HA

[56] References Cited

UNITED STATES PATENTS

| | | | |
|---|---|---|---|
| 3,341,481 | 9/1967 | Palmer | 260/2.5 HB |
| 3,542,702 | 11/1970 | Okada et al. | 260/2.5 HB |
| 3,562,355 | 2/1971 | Holden | 260/876 B |
| 3,562,356 | 2/1971 | Nyberg et al. | 260/876 B |
| 3,576,911 | 4/1971 | Maxey | 260/876 B |
| 3,600,462 | 8/1971 | Harmon | 260/876 B |
| 3,630,980 | 12/1971 | Russell | 260/876 B |
| 3,645,817 | 2/1972 | Walker et al. | 260/876 B |
| 3,709,806 | 1/1973 | Minami et al. | 260/2.5 HB |
| 3,855,378 | 12/1974 | Topcik | 260/2.5 HB |
| 3,886,100 | 5/1975 | Yasuda et al. | 260/2.5 HA |

Primary Examiner—Morton Foelak

[57] ABSTRACT

A cured cellular rubber composition having good resistance to shrinkage comprising a blend of a monovinyl-substituted aromatic compound/diene copolymer and an ethylene/vinyl acetate copolymer wherein the final blend has a block polystyrene content within the range of 10 to 30 weight percent.

9 Claims, No Drawings

NONSHRINK CELLULAR RUBBER COMPOSITION

BACKGROUND OF THE INVENTION

This invention relates to improved cured foam rubber compositions.

Microcellular vulcanized rubber is conventionally fabricated in two steps. The first step (precure) consists of the compression molding of the compound at a temperature high enough to vulcanize the rubber and decompose the blowing agent. After the first cure, the microcellular product continues to slowly shrink at room temperature. Thus, a second step (postcure or stabilization) is necessary to stabilize the product. This may be done by a second compression molding at the same temperature as the first one or more generally by heating in an air oven at 70° to 130° C. (for example, 1 hour at 130° C., 2 hours at 100° C., or 4 hours at 70° C.).

SUMMARY OF THE INVENTION

It is an object of this invention to provide a microcellular vulcanized rubber composition which is stable enough after a first cure to allow omission of any subsequent stabilization step;

it is a further object of this invention to provide an improved microcellular vulcanized rubber composition;

it is yet a further object of this invention to provide a microcellular vulcanized rubber composition having a reduced tendency to shrink; and it is still yet a further object of this invention to provide a microcellular vulcanized rubber foam having a linear shrinkage of no more than 1 percent.

In accordance with this invention, a cured rubber composition is provided comprising a monovinyl-substituted aromatic compound/diene block copolymer and an ethylene/vinyl acetate copolymer, the final product having from 10 to 30 weight percent block polystyrene.

DESCRIPTION OF THE PREFERRED EMBODIMENTS

The ethylene/vinyl acetate copolymer can be any conventional product having from 10 to 50 weight percent vinyl acetate content. Preferred materials are those having from 18 to 40 weight percent vinyl acetate. One particularly suitable material is that sold under the tradename EVA UE 634 which is an ethylene/vinyl acetate copolymer having a melt index (ASTM D 1238) of 6 g/10 min., a vinyl acetate content of 28 weight percent, a tensile strength of 120 kg/cm$^2$ and an elongation at break of 800 percent. This is manufactured by USI. Other suitable materials include Elvax 260 manufactured by duPont and EVA 2805 manufactured by ICI. The applicable ethylene/vinyl acetate copolymers are partially crystalline materials having sufficient vinyl acetate content to be somewhat rubbery yet not enough to be completely amorphous.

The vinyl aromatic diene copolymer must be a material which has a sufficient polystyrene block content to impart 10 to 30 weight percent block styrene to the final blend. Preferably, the final monovinyl-substituted aromatic compound/dieneethylene/vinyl acetate blend will have a block polystyrene content within the range of 11 to 25, more preferably 15 to 20 weight percent. The block copolymer itself generally will have a monovinyl-substituted aromatic compound control 20–60, preferably 30–48 weight percent and thus a diene content within the range of 80 to 40 weight percent, more preferably 70 to 52 weight percent.

The ratio of the ethylene/vinyl acetate copolymer to the monovinyl-substituted aromatic compound/diene copolymer can vary from 90/10 to 10/90 weight percent so long as the final blend contains 10 to 30 weight percent monovinyl-substituted aromatic compound block parted by the copolymer.

The preferred vinyl-substituted aromatic compound/diene copolymer is a styrene/butadiene copolymer although any normally solid copolymer of a conjugated diene having 4 to 12 carbon atoms per molecule with a monovinyl-substituted aromatic hydrocarbon having 8 to 18 carbon atoms per molecule can be utilized.

Any conventional blowing agent can be utilized which is capable of releasing gas at the curing temperature. Azo-type blowing agents are preferred. Azodicarbonamide sold under the tradename Genitron AC 3 by Fissons, London, England, is suitable. Other suitable materials are Porofor ADC/R sold by Bayer, Leverkusen, Germany, and A.Z. M2.S which is available from Societe Francaise d'Organo-Synthese, Gennevillers, France. A list of suitable blowing agents is set out on pages 372 and 373 of the *Modern Plastics Encyclopedia* for 1967, the disclosure of which is hereby incorporated by reference. Conventional promoters or retarders can also be utilized to adjust the decomposition temperature of the blowing agent.

The curing agent can be either a peroxide or sulfur curing agent of the type well known in the art. Preferred materials are organic peroxide curing agents. One suitable material is that sold by Montecatini-Edison under the tradename Peroximon F40 which is bis(t-butylperoxyisopropyl)benzene (40 percent) in calcium carbonate ($CaCO_3$). Another suitable curing agent is that sold under the tradename Percadox 14/40 sold by Akzo, Duren, Germany. Other suitable peroxides are disclosed in Interscience, *Encyclopedia of Polymer Science Technology*, Volume 9, pages 828–835 (1968), the disclosure of which is hereby incorporated by reference.

The compositions of this invention can contain other ingredients generally used in the rubber industry such as fillers, pigments, and the like. It is preferred that the composition not be oil extended.

Any conventional means can be utilized to formulate the blends of this invention such as Banbury mixing, roll milling and the like. Of course, it is essential to carry out the mixing after the blowing or curing agent has been added at a temperature at which they will not decompose.

The fabrication of the composition of this invention into a finished cellular product is carried out in a single step whereby the material is placed in a mold at a temperature high enough to vulcanize the rubber and decompose the blowing agent. The time and temperature for this curing is varied depending upon the particular blowing agent utilized and the particular crosslinking agent utilized. Generally, a temperature of 150° to 180° C. at a time of 7 to 12 minutes is satisfactory.

The specific gravity of the resulting microcellular product can be adjusted within some limits by varying the level of the blowing agent and curing agent. Specific gravities as low as 0.2 gram (i.e. density of 0.2 g/cc) can easily be obtained with products having a specific gravity within the range of 0.24 to 0.4 being preferred. The concentration of the blowing agent will generally be within the range of 1 to 5 weight percent based on the weight of the polymers and the concentration of the curing agent will generally be within the range of 0.4 to 5 weight percent, although again these can vary depending on the particular material being used.

Shrinkage of the product of the invention at room temperature is virtually nil. Resistance to shrinkage is further demonstrated by subjecting the composition of the invention to heating for 4 hours at 60° C in accordance with ASTM D 1917-67 (modified) after which heat treatment shrinkage is bound to be about 1 percent or less.

EXAMPLE

Blends of ethylene/vinyl acetate copolymer and butadiene/styrene copolymer were made on an open mill. In addition to the polymers, the compositions contained in percentage by weight based on the polymers: stearic acid, 1.5; paraffin wax, 2; zinc oxide (active), 1.5; Ultrasil VN 3 (a precipitated hydrated silica), 20 percent; Carbowax 4000 (polyethylene glycol), 1 percent; Ferrumine B (coated urea), 1 percent. The curing agent was Peroximon F40 which is bis(t-butylperoxyisopropyl)benzene benzene (40 percent) in $CaCO_3$. The concentration was varied from 0.3 to 3 weight percent depending on the cure characteristics of the blend. The blowing agent was Genitron AC3 which is azodicarbonamide and was used in a concentration of 1.5 weight percent. The ethylene/vinyl acetate copolymer was UE 634 sold by USI having a vinyl acetate content of 28 weight percent. Results were as follows:

product having a specific gravity of approximately 0.3 to 0.4 gram per mil.

While this invention has been described in detail for the purpose of illustration, it is not to be construed as limited thereby but is intended to cover all changes and modifications within the spirit and scope thereof.

What is claimed is:

1. A foamable blend consisting essentially of:
   a. a monovinyl-substituted aromatic compound/diene block copolymer, said monovinyl-substituted aromatic compound having 8 to 18 carbon atoms per molecule and said diene having 4 to 12 carbon atoms per molecule, said copolymer having 40 to 80 weight percent diene;
   b. an ethylene/vinyl acetate copolymer, said copolymer having 10 to 50 weight percent vinyl acetate;
   c. a blowing agent; and
   d. a curing agent, said component (a) being present in an amount sufficient to give 10 to 30 weight percent block styrene homopolymer in said total blend of polymers and a ratio of said component (a) to (b) being within the range of 10/90 to 90/10.

2. A composition according to claim 1 wherein said block copolymer is a styrene/butadiene block copolymer.

3. A composition according to claim 2 wherein said blowing agent is an azo compound.

4. A composition according to claim 2 wherein said curing agent is an organic peroxide.

5. A composition according to claim 2 wherein said styrene/butadiene block copolymer has 52 to 70 weight percent butadiene and said ethylene/vinyl acetate co- Table

| Run | Blend Composition[1] | Mol. Wt. | Properties of Bd-Sty Copolymer Block Polystyrene, Wt. % | Oil Extended | Block Polystyrene in Final EVA-Bd-Sty Blend, Wt. % | Blend Curing Temp °C | Blend Curing Time, Min | % Linear Shrinkage After 4 Hours at 60° C | Peroxide Curing Agent wt % based on Total Polymer |
|---|---|---|---|---|---|---|---|---|---|
| 1 | EVA+Bd/Sty 52/48 Block Copolymer | 101 × 10³ | 30 | No | 15 | 160 | 9 | 0.2 (Invention) | 3 |
| 2 | EVA+Bd/Sty 52/48 Block Copolymer | 268 × 10³ | 30 | 37.5 phr | 15 | 170 | 9 | 2.6 | 3 |
| 3 | EVA+Bd/Sty 75/25 Random Copolymer | 212 × 10³ | 0 | No | 0 | 170 | 9 | 3.3 | 0.4 |
| 4 | EVA+Bd/Sty 52/48 Block Copolymer | 149 × 10³ | 11 | No | 5.5 | 170 | 9 | 4.1 | 0.3 |
| 5 | EVA+Bd/Sty 75/25 Block Copolymer | 83 × 10³ | 18 | No | 9 | 170 | 9 | 3.6 | 0.3 |
| 6 | EVA+Bd/Sty 52/48 Block Copolymer | 101 × 10³ | 30 | No | 15 | 160 | 8 | 0.2 (Invention) | 3 |
| 7 | EVA+Bd/Sty 60/40 Block Copolymer | 320 × 10³ | 40 | No | 20 | 160 | 8 | 0.4 (Invention) | 0.6 |
| 8 | EVA+Bd/Sty 70/30 Block Copolymer | 338 × 10³ | 30 | No | 15 | 160 | 8 | 0.2 (Invention) | 0.3 |
| 9 | EVA+Bd/Sty 60/40 Block Copolymer | 160 × 10³ | 40 | No | 20 | 160 | 8 | 0.4 (Invention) | 0.6 |
| 10 | EVA+Bd/Sty 70/30 Block Copolymer | 162 × 10³ | 22 | No | 11 | 160 | 8 | 1.0 (Invention) | 0.4 |
| 11 | EVA+Bd/Sty 75/25 Random Copolymer | 212 × 10³ | 0 | No | 0 | 160 | 8 | 2.6 | 0.4 |
| 12 | EVA+Bd/Sty 75/25 Random Copolymer | 259 × 10³ | 0 | No | 0 | 160 | 8 | 3.0 | 0.4 |
| 13 | EVA/BBR/HSR[2] | — | 50 | No | 15 | 160 | 8 | 3.4 | 0.8 |

[1]All blends are blends except run 13 of 50 parts by wt. ethylene vinyl acetate and 50 parts by weight of butadiene/styrene copolymer.
[2]50 parts EVA plus 50 parts of a 50/50 blend of random butadiene-styrene rubber plus general purpose High Styrene Resin made by the emulsion process, the latter constituting the "Block" in this recipe.

Runs 1 and 6 to 10 showed that when the blend has at least about 11 weight percent block polystyrene from the styrene/butadiene block copolymer the linear shrinkage is 1 percent or below. Control Run 2 shows that the presence of oil is undesirable. Control Run 3 shows that the random copolymer will not work. Control Runs 4 and 5 show that the block copolymer must impart more than 9 percent block polystyrene into the final blend. Runs 10 and 11 further show that random copolymer is not operable for the purpose of the invention and Run 12 shows that achieving the same polystyrene content by means of blending a High Styrene Resin made by the emulsion process and a SBR rubber is not effective.

These compositions were cured in a compression mold for 8 minutes at 160° C. to give a microcellular polymer has 18 to 40 weight percent vinyl acetate.

6. A composition according to claim 2 wherein said component (a) is present in amounts sufficient to give 11 to 25 weight percent styrene homopolymer block in said blend.

7. A composition according to claim 6 wherein said component (a) is present in amounts sufficient to give 15 to 20 weight percent styrene homopolymer block in said blend, said ethylene/vinyl acetate copolymer contains 18 to 40 weight percent vinyl acetate, said blowing agent comprises azo-dicarbonamide and said peroxide comprises bis(t-butylperoxyisopropyl)benzene.

8. A composition according to claim 7 in the form of a cured microcellular foam having a linear shrinkage after 4 hours at 60° C. of no more than 1 percent.

9. The composition according to claim 1 in the form of a cured microcellular foam.

* * * * *